United States Patent
Koslowski et al.

Patent Number: 5,562,546
Date of Patent: Oct. 8, 1996

[54] SNAP IN PLUG FOR A SLIP YOKE

[75] Inventors: Gary J. Koslowski, Shelby Township; Craig Holt, Harrison Township, both of Mich.

[73] Assignee: Rockwell International Corporation, Pittsburgh, Pa.

[21] Appl. No.: 412,074

[22] Filed: Mar. 28, 1995

[51] Int. Cl.$^6$ ........................................ F16C 3/03
[52] U.S. Cl. .................. 464/162; 403/359; 403/DIG. 7; 464/172; 464/181
[58] Field of Search ........................ 464/132, 162, 464/181, 179, 905, 133, 172; 403/359, 298, 109, DIG. 7, 327

[56] References Cited

U.S. PATENT DOCUMENTS

| | | | |
|---|---|---|---|
| Re. 27,068 | 2/1971 | Groves et al. | 464/162 |
| Re. 33,322 | 9/1990 | Sills et al. | 464/162 |
| 1,304,901 | 5/1919 | Peters . | |
| 1,541,007 | 6/1925 | Thiemer . | |
| 1,621,219 | 3/1927 | Peters . | |
| 1,917,988 | 7/1933 | Large . | |
| 2,116,290 | 5/1938 | Spicer . | |
| 2,198,654 | 4/1940 | Calkins et al. | 464/162 X |
| 2,510,362 | 6/1950 | Anderson . | |
| 2,839,902 | 6/1958 | Glover . | |
| 3,063,266 | 11/1962 | Rabson . | |
| 3,123,990 | 3/1964 | Freeman . | |
| 3,234,758 | 2/1966 | Lewis | 464/162 X |
| 3,344,618 | 10/1967 | Young . | |
| 3,367,142 | 2/1968 | Groves et al. . | |
| 3,400,558 | 9/1968 | Haines . | |
| 3,508,418 | 4/1970 | Jones . | |
| 3,577,746 | 5/1971 | Dolan | 464/162 X |
| 3,650,123 | 3/1972 | Sheppard, Jr. . | |
| 3,989,259 | 11/1976 | Lorenz et al. | 277/169 |
| 4,114,898 | 9/1978 | Bainard et al. | 277/9 |
| 4,319,467 | 3/1982 | Hegler et al. . | |
| 4,475,737 | 10/1984 | Cook, Jr. et al. | 277/182 |
| 4,552,544 | 11/1985 | Beckman et al. | 464/162 |
| 4,573,946 | 3/1986 | Brissette | 464/133 |
| 4,580,996 | 4/1986 | Brissette | 464/133 |
| 4,892,433 | 1/1990 | Schreiber | 403/359 |
| 5,078,533 | 1/1992 | Madonio et al. | 403/288 |
| 5,299,982 | 4/1994 | Burton | 464/162 X |

Primary Examiner—Daniel P. Stodola
Assistant Examiner—Eileen A. Dunn

[57] ABSTRACT

A plug closes the end bore of a slip yoke. A plurality of teeth are cast into a counterbore formed at an end of the slip yoke. The rigid plug snaps behind the teeth to be retained within the counterbore. The teeth are circumferentially spaced and may be formed when the slip yoke is cast. The rigid plug has an edge that extends radially outwardly to engage an inner peripheral surface of the counterbore and retain the plug. The teeth prevent movement of the plug outwardly of the bore.

19 Claims, 2 Drawing Sheets

SNAP IN PLUG FOR A SLIP YOKE

BACKGROUND OF THE INVENTION

This invention relates to a plug for closing the end of a slip yoke that is snapped into place, and does not require any machining of the slip yoke.

Drive trains for use in heavy duty applications often include a slip yoke connection for connecting a splined shaft to a universal joint yoke. The slip yoke includes a bore that receives the splined connection from the shaft. The splined shaft can move axially within the slip yoke bore. Lubricant is applied at the connection between the slip yoke and the splined shaft. Thus, the end of the slip yoke bore must be sealed by a plug to keep contaminants out and the lubricant in.

In the prior art, plugs have typically been staked or welded into the bore of the slip yoke. These connections have been labor intensive, and have at times weakened the slip yoke structure. Moreover, it has been difficult to control the assembly of the plugs to insure proper placement.

One proposed slip yoke connection includes a plug received in a machined groove at the end of the slip yoke. Such a connection requires expensive and difficult machining to form the groove in the end of the slip yoke.

In addition, to allow the plug to reach the groove, the plug is formed with flexible portions that allow the plug to move into the groove. These flexible portions are undesirable in that they create localized weak spots circumferentially about the plug, and may result in undesirable leakage. Also, the flexible portions may result in the plug being forced outwardly of the groove as the shaft moves within the bore and increases the pressure on the plug.

SUMMARY OF THE INVENTION

In a disclosed embodiment of this invention, a plug is received within a counterbore in the slip yoke. The plug has a relatively rigid central body and curved edge which engage the counterbore. A plurality of circumferentially spaced teeth secure the plug within the counterbore. The teeth are cast as part of the yoke, and no specialized machining is required. Rather, the teeth may be cast with the yoke.

In a preferred feature of this invention, the plug edge curves rearwardly around an outer ring to a locking edge which engages the inner peripheral surface of the counterbore. The plug has a small degree of axial freedom of movement such that as the splined shaft moves, the plug is free to adjust to that movement and the changes in pressure within the bore.

The inventive plug may be formed of steel or a rigid polymer, and is held within the counterbore by the cast teeth on the bore. In optional features of this invention, an O-ring may be captured behind the plug edge to provide a fluid tight seal. In the absence of an O-ring, the plug edge itself provides a sufficiently fluid tight seal such that only a minimal amount of lubricant is likely around the plug.

These and other features of the present invention can be best understood from the following specification and drawings, of which the following is a brief description of the drawings.

DETAILED DESCRIPTION OF A PREFERRED EMBODIMENT

Figure 1:
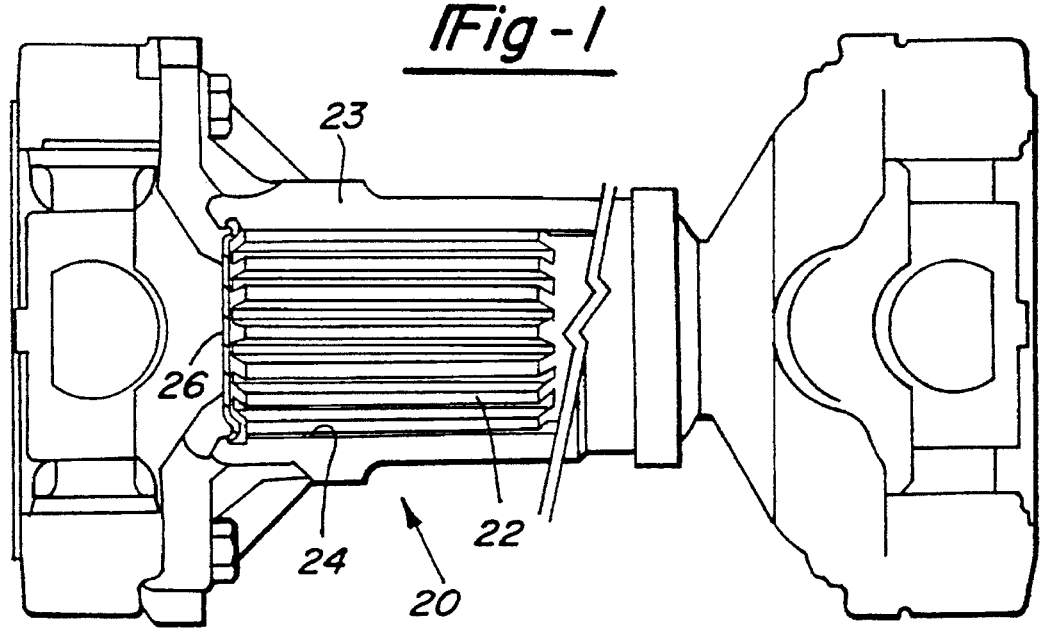
FIG. 1 is a partially cut away view of a slip yoke splined shaft connection.

A slip yoke drive connection 20 is illustrated in FIG. 1 for connecting a splined shaft 22 within a slip yoke 23. An inner bore 24 of slip yoke 23 receives the splined shaft 22. This type connection is typically used in a drive line transmission for heavy duty vehicles. The slip yoke 23 is typically connected to a cross member of a universal joint. As the vehicle moves, the splined shaft 22 may move axially within bore 24. As the end of the splined shaft 22 moves within the bore, lubricant within the bore is forced to the left or right, as shown in FIG. 1. A plug 26 is snapped into the end of the bore to seal against contaminants, and retain lubricant within bore 24. Plug 26 must be sufficiently rigid such that as the shaft 22 moves axially, the plug 26 will not be blown outwardly of the bore. As the splined shaft 22 moves axially, lubricant forwardly of the shaft will be compressed against the plug. If the plug is not sufficiently rigid to withstand this force, it could be driven outwardly of the bore 24.

Figure 2:
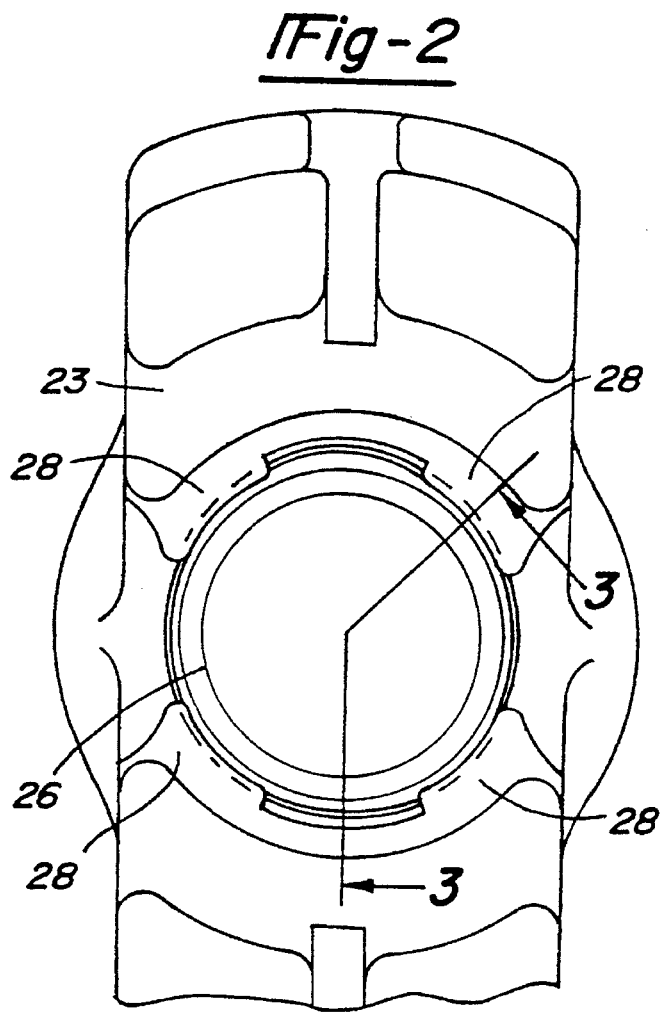
FIG. 2 is an end view of the slip yoke as shown in FIG. 1.

As shown in FIG. 2, the plug 26 is received behind four teeth 28 which are cast into the slip yoke 23. The teeth 28 are cast at circumferentially spaced locations in the slip yoke 23. No machining is necessary.

Figure 3A:
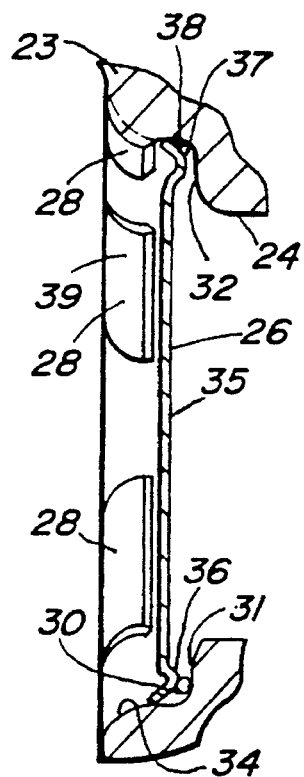
FIGS. 3A and 3B are a cross-sectional view along line 3—3 as shown in FIG. 2.
Figure 3B:
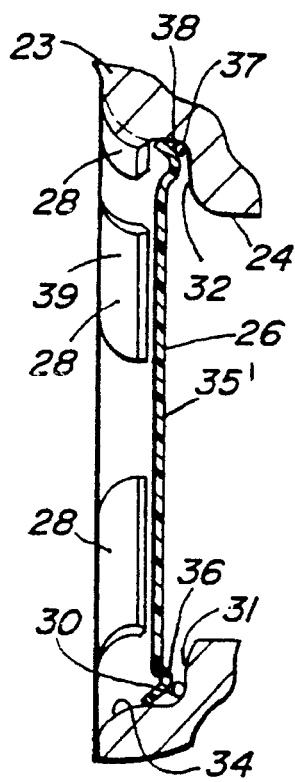

As shown in FIGS. 3A and 3B, the plug 26 has an edge 30 extending at an angle to a central axis of the plug 26 and received forwardly of a end wall 31 of a counterbore 32 in the slip yoke 23. As shown, edge 30 engages the inner peripheral surface 34 of counterbore 32.

As also shown, the plug 26 includes a central planer portion 35 and a ring 36 leading to edge 30. The connection between edge 30 and inner peripheral surface 34 of counterbore 32 provides adequate sealing. The spaced teeth 28 insure that the plug 26 is retained within counterbore 32. Since the plug is sufficiently rigid that it can withstand varying pressures within the bore 24, the plug is not driven outwardly of the bore. In certain applications, it might be desirable to place an O-ring 37 behind the edge 30 such that the O-ring will be compressed against the counterbore 32 to provide an even more fluid-tight seal.

As also shown, edge 30 extends at an angle towards the outer end of the counterbore 32. An inner face 38 of edge 30 is thus ramped. Teeth 28 are also formed with a ramped outer surface 39. To snap plug 26 into counterbore 32, plug 26 is firmly grasped, by a tool or manually, and forced rearwardly against teeth 28. The outer wall 39 of the teeth 28 guide face 38 such that edge 30 snaps behind teeth 28. Once plug 26 is received behind teeth 28, however, the plug is rigid and has no localized weak or flexible portions. Thus, plug 26 is firmly retained within counterbore 32.

Figure 4:
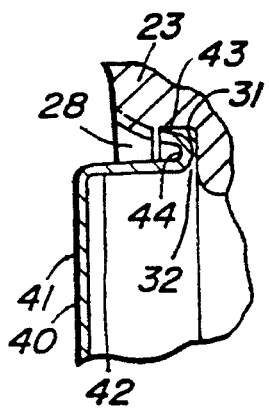
FIG. 4 shows a cross-section similar to that shown in FIG. 3, but with a second embodiment plug.

As shown in FIG. 4, a second embodiment plug 40 has a deep central portion 41 leading to a cylindrical rearwardly extending portion 42 that is connected to the edge 43 through a ring 44. Teeth 28 secure the plug within the shoulder. Plug 40 is utilized for connections where it can be expected that shaft 22 will move through a relatively great axial extent compared to the movement expected with plug 26.

Plug 40 is also snapped behind the teeth 28 in a similar fashion to that utilized with plug 26. With plug 40, there are also no localized flexible or weakened portions that could result in undesirable leakage or in the plug being driven outwardly of the counterbore 32.

The dimensions and construction of the plugs may be varied to accommodate various drive shaft combinations. The plug may be formed of steel or of a polymer that has sufficient rigidity to withstand the varying pressures within bore 24. FIG. 3B shows a plug 35' being made of polymer.

A preferred embodiment of this invention has been disclosed, however, a worker of ordinary skill in the art would recognize that certain modifications will come within the scope of this invention. For that reason, the following claims should be studied to determine the true scope and content of this invention.

We claim:

1. A drive transmission comprising:

a slip yoke having a central bore extending between a first end and a second end, a counterbore formed about said central bore at said second end, said counterbore defining a counterbore end wall and an inner peripheral surface of said counterbore, a plurality of teeth extending radially inwardly from said inner peripheral surface of said counterbore;

a shaft slidably received within said central bore, said shaft extending into said central bore from said first end and toward said second end; and a relatively rigid plug snapped behind said plurality of teeth, and received between said teeth and said counterbore end wall to close said second end of said counterbore.

2. A drive transmission as recited in claim 1, wherein said shaft is a splined shaft received within said central bore.

3. A drive transmission as recited in claim 1, wherein said teeth being formed at a position spaced toward said second end from said end wall, said plug being received between said end wall and said teeth.

4. A drive transmission as recited in claim 3, wherein said plug includes a generally circular central portion, and an angled edge portion extending at an angle towards said second end, said edge portion engaging said inner peripheral surface of said counterbore to close said second end of said central bore.

5. A drive transmission as recited in claim 4, wherein said plug includes a cylindrical portion extending generally parallel to an axis of said central bore rearwardly from said central portion towards said first end of said central bore, and said edge portion extending at an angle back toward said second end from an end of said cylindrical portion.

6. A drive transmission as recited in claim 4, wherein said teeth have an outer surface that is ramped to be complimentary to said edge portion, such that the complimentary surfaces of said edge portion and said teeth guide said edge portion inwardly to facilitate snapping of said plug behind said teeth.

7. A drive transmission as recited in claim 3, wherein said teeth have a ramped outwardly facing surface to guide said plug to be snapped behind said teeth.

8. A drive transmission as recited in claim 1, wherein said plug is formed of a metal.

9. A drive transmission as recited in claim 1, wherein said plug is formed of a polymer.

10. A drive transmission as recited in claim 1, wherein an O-ring is compressed between said plug and said counterbore end wall.

11. A drive transmission as recited in claim 1, wherein said teeth are integrally cast with said slip yoke.

12. A drive transmission as recited in claim 11, wherein said plug is formed of a metal.

13. A drive transmission comprising:

a slip yoke having a central bore extending between a first end and a second end, a counterbore formed about said central bore at said second end, said counterbore defining a counterbore end wall and an inner peripheral surface of said counterbore, a plurality of teeth extending radially inwardly from said inner peripheral surface of said counterbore;

a shaft slidably received within said central bore, said shaft extending into said central bore from said first end and toward said second end; and a relatively rigid plug snapped behind said teeth, and received between said teeth and said end wall of said counterbore to close said second end of said counterbore, said plug including a generally circular central portion and an angled portion extending at an angle toward said second end, said teeth being formed with a ramped outwardly facing surface, and said ramped outwardly facing surface and said angled edge of said plug facilitating snapping of said plug behind said teeth.

14. A drive transmission as recited in claim 13, wherein said shaft is a splined shaft received within said central bore.

15. A drive transmission as recited in claim 13, wherein said teeth being formed at a position spaced toward said second end from said end wall, said plug being received between said end wall and said teeth.

16. A drive transmission as recited in claim 13, wherein said plug includes a cylindrical portion extending generally parallel to an axis of said central bore rearwardly from said central portion towards said first end, and said edge portion extending at an angle back toward said second end from an end of said cylindrical portion.

17. A drive transmission as recited in claim 13, wherein said plug is formed of a polymer.

18. A drive transmission as recited in claim 13, wherein an O-ring is compressed between said plug and said counterbore end wall.

19. A drive transmission as recited in claim 13, wherein said teeth are integrally cast with said slip yoke.

* * * * *